United States Patent
Liljeström

(10) Patent No.: US 7,277,509 B2
(45) Date of Patent: Oct. 2, 2007

(54) LOW COMPLEXITY FREQUENCY-OFFSET CORRECTION METHOD

(75) Inventor: Henrik Liljeström, Helsinki (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 10/418,302

(22) Filed: Apr. 18, 2003

(65) Prior Publication Data

US 2004/0156422 A1    Aug. 12, 2004

Related U.S. Application Data

(60) Provisional application No. 60/445,814, filed on Feb. 10, 2003.

(51) Int. Cl.
*H04L 27/06*    (2006.01)
(52) U.S. Cl. ............... 375/344; 375/147; 375/148; 375/149; 375/150
(58) Field of Classification Search ............ 375/344, 375/147, 148, 149, 150
See application file for complete search history.

(56) References Cited

U.S. PATENT DOCUMENTS

| | | | |
|---|---|---|---|
| 5,799,010 A * | 8/1998 | Lomp et al. ........... | 370/335 |
| 6,229,843 B1 * | 5/2001 | Lomp et al. ........... | 375/150 |
| 6,363,102 B1 * | 3/2002 | Ling et al. ........... | 375/147 |
| 6,456,608 B1 * | 9/2002 | Lomp ............... | 370/335 |
| 6,697,350 B2 * | 2/2004 | Lomp ............... | 370/342 |
| 6,983,009 B2 * | 1/2006 | Lomp ............... | 375/149 |
| 2003/0076812 A1 * | 4/2003 | Benedittis ........... | 370/350 |
| 2003/0193914 A1 * | 10/2003 | Lomp et al. ........... | 370/335 |

FOREIGN PATENT DOCUMENTS

EP    1160981 A2    12/2001

* cited by examiner

*Primary Examiner*—David C. Payne
*Assistant Examiner*—Nader Bolourchi
(74) *Attorney, Agent, or Firm*—Squire, Sanders & Dempsey L.L.P.

(57) ABSTRACT

A receiver for use in a mobile communications network, the receiver comprising an input for receiving radio signals including control symbols and data symbols, a channel estimator arranged to use the control symbols to provide a channel estimate for correcting received data symbols, a first offset corrector for de-rotating the control symbols prior to their use in providing the channel estimate, a second offset corrector for rotating the channel estimate prior to its use in correcting the received data symbols, and an offset estimator arranged to generate estimates of frequency offset in the received radio signal, for use in the first and second offset correctors.

31 Claims, 6 Drawing Sheets

LOW COMPLEXITY FREQUENCY-OFFSET CORRECTION METHOD

CROSS REFERENCE TO RELATED APPLICATIONS

This application claims priority of U.S. Provisional Patent Application Ser. No. 60/445,814, entitled "Low-Complexity Frequency-Offset Correction Method," filed on Feb. 10, 2003, the contents of which are hereby incorporated by reference.

BACKGROUND OF THE INVENTION

1. Field of the Invention

The present invention relates to the correction of carrier frequency offsets in a mobile communication network.

2. Description of the Related Art

FIG. 1 illustrates a prior art receiver arrangement for receiving a CDMA signal. An analogue oscillating signal on a radio frequency is received through an antenna 2, down-converted onto a complex base band frequency signal in a receiver 4 and converted into a series of digital samples in an A/D converter 6. In the present CDMA receiver, despreading of the signal is performed by first supplying samples to a multiplier 10 for multiplying the received samples by the complex conjugate of a long code (referred to as "a scrambling code" in WCDMA). The scrambling code is used to separate different users. The signal from the multiplier 10 is supplied to a further multiplier 16 for multiplying the signal with a short code. The short code is used to separate the control channel from the data channel. The resulting despread data signal is then integrated in an integrator block 18.

The signal from the multiplier 10 is also supplied to a further integrator 12, the integrated control symbols being supplied to a channel estimation block 14. The channel estimation block 14 estimates the complex channel coefficient of the radio channel using pilot signal information (or a training sequence in TDMA receiver), and provides a channel estimate for removing the effects of the radio channel from the received signal. The signal from the integrator 18 is multiplied by the complex conjugate of the channel estimate at multiplier 20. The resulting output includes recovered data in the form of soft symbol data with reliability information associated with the recovered data.

The output is further transformed into a real signal in block 22, and then supplied to subsequent de-coding operations. It will be appreciated that the imaginary part may also include data, in which case the invention could likewise be applied to the imaginary part. A problem that exists with the system illustrated in FIG. 1 is the existence of frequency errors, or "carrier frequency offsets" in the received signal. There are two main causes for such frequency offsets. The first one is a frequency offset in the receiver oscillator, which is used for downconverting the received RF signal. This means that there is a frequency offset between the receiver oscillator frequency and the carrier frequency of the base station. This offset, for example, degrades the performance of the channel estimator.

Another cause for rotation of the signal is the so-called Doppler effect. This means that the length of the radio signal path between the mobile station and the base station changes when the mobile station moves. This causes a Doppler shift in the spectrum in the received signal. A mobile station synchronises its system clock according to the received signal from the base station. For a moving mobile, the Doppler effect will modify the observed carrier frequency. Therefore the mobile will end up transmitting the wrong carrier frequency. When the base station receives the signal the Doppler effect has again modified the carrier frequency in the same direction so the base station observes a carrier frequency offset that is two times the Doppler shift.

In mobile station receivers, the frequency offset may be detected and the frequency of the local oscillator can be controlled to remove the offset. However, this relies on information being available as to the exact amount of the frequency offset. Another problem is that the resolution of the oscillator frequency adjustment is usually too coarse to adequately compensate the frequency offset. In base station receivers it is not possible to adjust the local oscillator frequency, because the local oscillators are common for several channels and the frequency offset is usually different for signals that were received from different mobile stations.

A significant problem with the carrier frequency offset is that it shifts the power spectrum of the received signal. Because of the Doppler shift, the spectrum is no longer symmetric so, a channel estimator with real valued filter coefficients no longer works in an optimum way.

One existing approach to deal with this problem is that the carrier frequency offset is not corrected at all. The main idea here is to choose filter coefficients with a large enough passband so that the actual signal is not filtered away in channel estimation. This has very poor performance with large carrier frequency errors.

In the system illustrated in FIG. 1, the effective carrier frequency offsets can be corrected by the use of complex valued filter coefficients in the channel estimator 14. This allows for the compensation of the static rotation of the channel in the filtering step used to estimate the channel. The required computation depends on the chosen filter, but is in any event quite large. It is often not feasible to implement the required computations in a practical system with adequate performance.

Another possibility for correcting the carrier frequency offset is to monitor the phase of the channel estimate and generate a complex phasor on the basis of successive phase values. The resulting phasor is then used to correct the received base band signal before or after channel estimation. The carrier frequency offset is removed by de-rotating samples both after descrambling with the long code and descrambling with the short code. A disadvantage with this method is that the computations which are required depend on the data rate. Also, the number of computations which is required is so high that it is not feasible to implement this with DSP software in a practical system. Such a system is discussed in EP-A-1160981.

SUMMARY OF THE INVENTION

It is an object of the invention to correct frequency offsets in radio carriers, while reducing the computational complexity required to do so.

According to one aspect of the invention there is provided a receiver for use in a mobile communications network, the receiver having an input for receiving radio signals including control symbols and data symbols; a channel estimator arranged to use the control symbols to provide a channel estimate for correcting received data symbols; a first offset corrector for de-rotating the control symbols prior to their use in providing the channel estimate; a second offset corrector for rotating the channel estimate prior to its use in correcting the received data symbols; and an offset estimator arranged to generate estimates of frequency offset in the received radio signal, for use in the first and second offset correctors. The offset can be estimated based on the control symbols.

According to another aspect of the invention there is provided a method for correcting frequency offset in a received radio signal, the method having the steps of using control symbols in the received radio signal to provide a channel estimate; generating an estimate of frequency offset in the received radio signal; de-rotating control symbols prior to their use in providing the channel estimate; rotating the channel estimate; and using the rotated channel estimate to correct data symbols in the received radio signal; wherein the steps of de-rotating the control symbols and rotating the channel estimate are carried out using estimates of frequency offset.

A radio signal used in a mobile communication network can have a sequence of time slots, each time slot including data symbols and control symbols. The receiver can include a filter, which is arranged to generate a first set of control samples representing the control symbols for each time slot. It will be appreciated that data symbols and control symbols can be sent on the same channel, or on separate channels.

In one embodiment, the offset estimator is arranged to produce one estimate of frequency offset for each time slot based on the first set of control samples. This one estimate is used to update a phasor for both the first and second offset correctors.

In another embodiment, a second filter can be arranged to receive the first set of control samples and to produce a second set having a different number of control samples for supply to the first offset corrector. A number of frequency estimates is produced for that time slot to correct the number of control samples in the second set supplied to the first offset corrector. It is also possible to include a first interpolator for receiving values representing the channel estimate from the channel estimator and arranged to generate interpolated values between the received values, the received values and the interpolated values being supplied to the second offset corrector. In that case, a second set of frequency offset estimates can be produced for that time slot matching in number the number of received values and interpolated values to be rotated at the second offset corrector.

If necessary, a third filter can be connected to receive de-rotated control samples from the first offset corrector and to supply samples to the channel estimator at a sampling rate different from that of the de-rotated control samples.

Likewise, a second interpolator can be provided for receiving rotated channel estimate values from the second offset corrector and for providing interpolated values from said values and for supplying said received values and said interpolated values for correcting received data symbols.

The receiver can implement a feed back or a feed forward offset correction system.

In a feed forward offset correction system, the first set of control samples is de-rotated at the first offset corrector using the one estimate produced for the same time slot as for the control samples.

In a feed back offset correction system, the offset estimator is arranged to generate said one estimate from control symbols of a first time slot and the first offset corrector is arranged to de-rotate the first set of control samples generated for a second time slot based on said one estimate produced for the first time slot.

As described more particularly with reference to the following exemplary embodiment, this invention corrects the carrier frequency offset from a received radio signal. This is done in a preferred embodiment by estimating the carrier frequency offset from the complex auto-correlation of the control symbols. Using the carrier frequency offset estimate, the carrier frequency offset is removed from the control channel by de-rotating the control symbols. After the control symbols have been de-rotated, normal channel estimation can be carried out using the de-rotated control symbols. Before the channel estimates are used to correct data symbols, however, the channel estimates need to be rotated to the correct phase.

Carrier frequency offset in a received signal causes a static rotation of the received signal. By taking the static rotation into account in the channel estimation, it is possible to totally remove the carrier frequency offset. In this way, the carrier frequency offset in the received signal does not degrade the performance of the receiver.

In any situation where the carrier frequency offset is corrected, the performance of the receiver is approximately the same, or rather it depends on how often updates are made. It is important to try and reduce as far as possible the required computational complexity needed in order to remove the carrier frequency offset, in particular because this controls how often estimates can be made and this therefore has an impact on performance.

The technique described herein has the following benefits over earlier known techniques.

It is possible to implement the technique with a fixed amount of computations for each round, because it does not depend on the data rate because only the control symbols are used to generate the frequency offset estimate and only the control signals are de-rotated using that estimate (prior to channel estimation).

The channel estimation can be carried out with real valued filter coefficients. This means only roughly half of the computations, which are required in a situation where channel estimation requires the use of complex valued filter coefficients.

The technique described in the following allows for control symbols to be de-rotated directly, or for control symbols at a reduced sampling rate to be de-rotated. Therefore the sample rate can be varied.

The technique described in the following is such of that the computational complexities are at a level where it is feasible to implement the method on DSP software. The method could also be implemented on ASIC.

BRIEF DESCRIPTION OF THE DRAWINGS

For a better understanding of the present invention and to show how the claim may be carried into effect reference will now be made by way of example to the accompanying drawings:

DETAILED DESCRIPTION OF THE PREFERRED EMBODIMENT(S)

Figure 1:
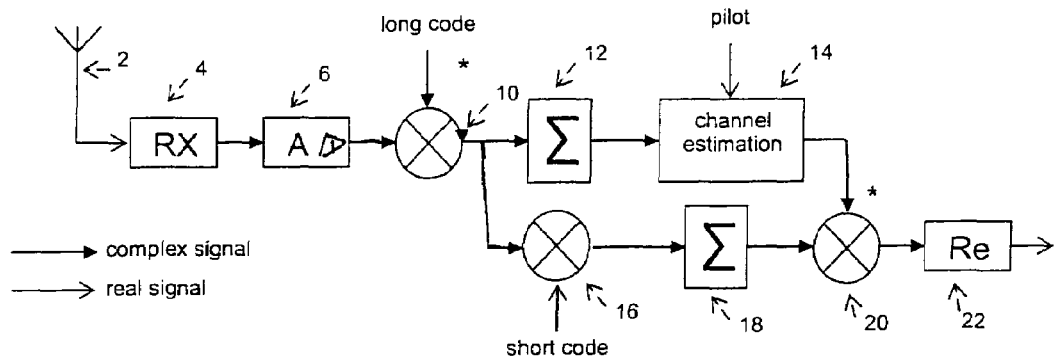
FIG. 1 is a schematic block diagram of a prior art receiver arrangement.
Figure 2:
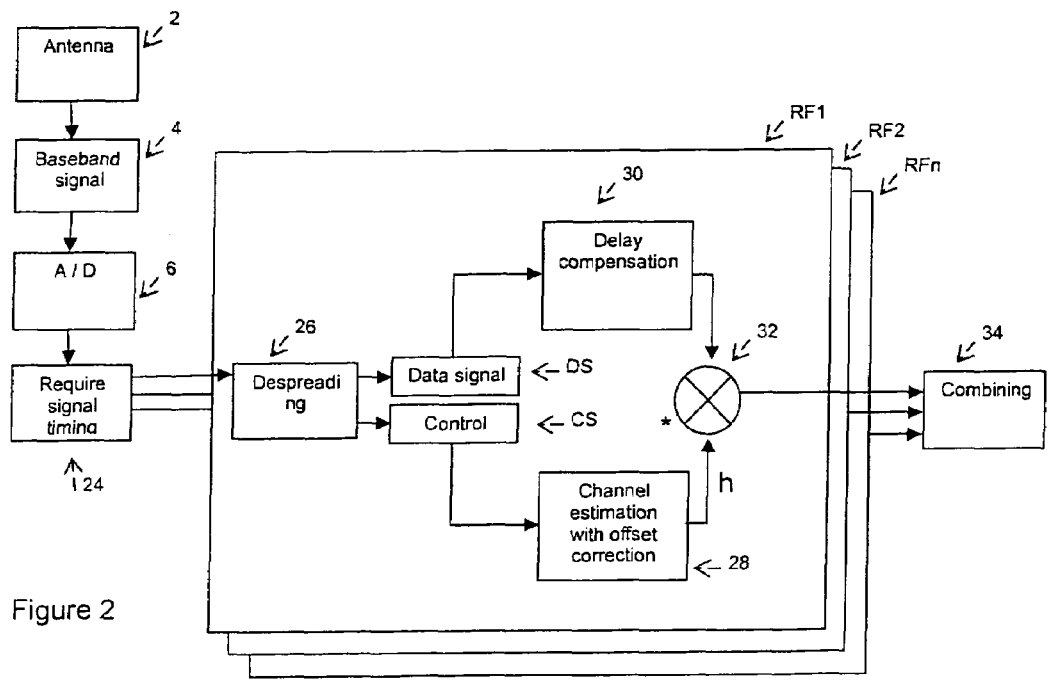
FIG. 2 is a schematic block diagram showing a rake receiver showing one embodiment of the invention.

FIG. 2 illustrates in schematic form a rake receiver implementing one embodiment of the invention. FIG. 2 illustrates an antenna 2, a receiver 4 implementing base band conversion, and an A-D converter 6. Signal timing is provided by signal timing block 24 and the resulting timed signal is supplied to a despreader 26 in a first one RF1 of a set of rake fingers RF1 . . . RFn. The despreader 26 produces a control signal in the form of control samples CS and a data signal in the form of data samples DS. The control and data samples are derived from incoming control and data symbols by filtering. The spreading factor of the channel determines how many of the symbols from the despreader output are summed. In WCDMA uplink, the spreading factor for the control channel (DPCCH) is 256, and for the data channel (DPDCH) it can be 4, 8, 16, 32, 64, 128 or 256. It will be appreciated that in a mobile communication system, control symbols and data symbols can be transmitted over a common channel, or over separate control and data channels. In either case, information is transmitted in a sequence of time slots, control symbols associated with a particular time slot being used to estimate the channel for correction of data symbols in the same time slot or an adjacent time slot. In the diagram of FIG. 2, the control symbols are shown supplied to a channel estimation block 28. The channel estimation block 28 includes the capability of providing offset correction in a manner which will be discussed more fully hereinafter, but based on the control symbols. The data samples DS are supplied via a delay-compensation block 30 which compensates for the delay caused by the channel estimate filtering to a multiplier 32, which behaves like the multiplier 20 in FIG. 1 in that it multiplies a complex conjugate of the channel estimate h from the channel estimation block 28 by the delayed data samples. The output of the rake fingers RF1, RF2 . . . RFn are combined in a combining block 34 and result supplied to subsequent conversion and decoding circuitry.

Figure 3:
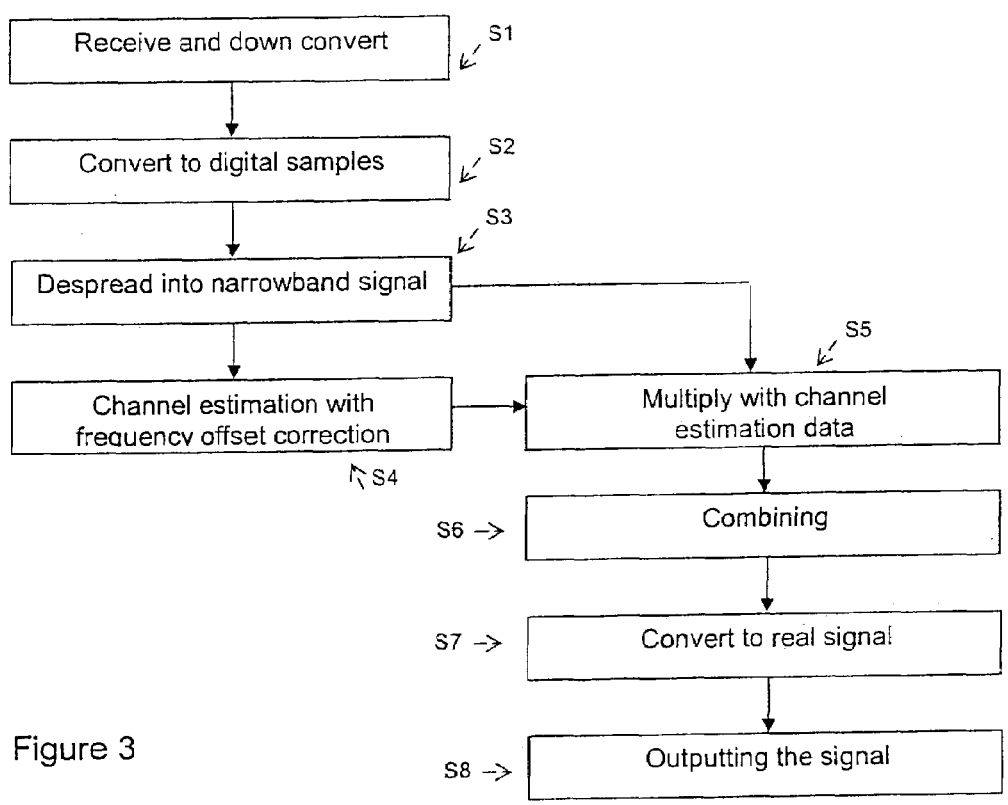
FIG. 3 is a flow diagram illustrating operation of the circuit of FIG. 2.

FIG. 3 is a flow chart illustrating one example of the operation of the circuit of FIG. 2. At step S1, the signal is received and down converted. At step S2 it is converted into digital samples and at step S3 it is despread into a narrow band signal. At step S4, the channel is estimated with frequency offset correction as discussed later. The channel estimates are multiplied by the despread data at step S5. The outputs of the rake fingers are combined at S6 and the combined output is converted into a real signal S7. The real signal is an output to subsequent decode circuitry etc at step S8. As mentioned earlier, if the imaginary part also contains data, then the invention could similarly be applied to the imaginary part.

Figure 4:
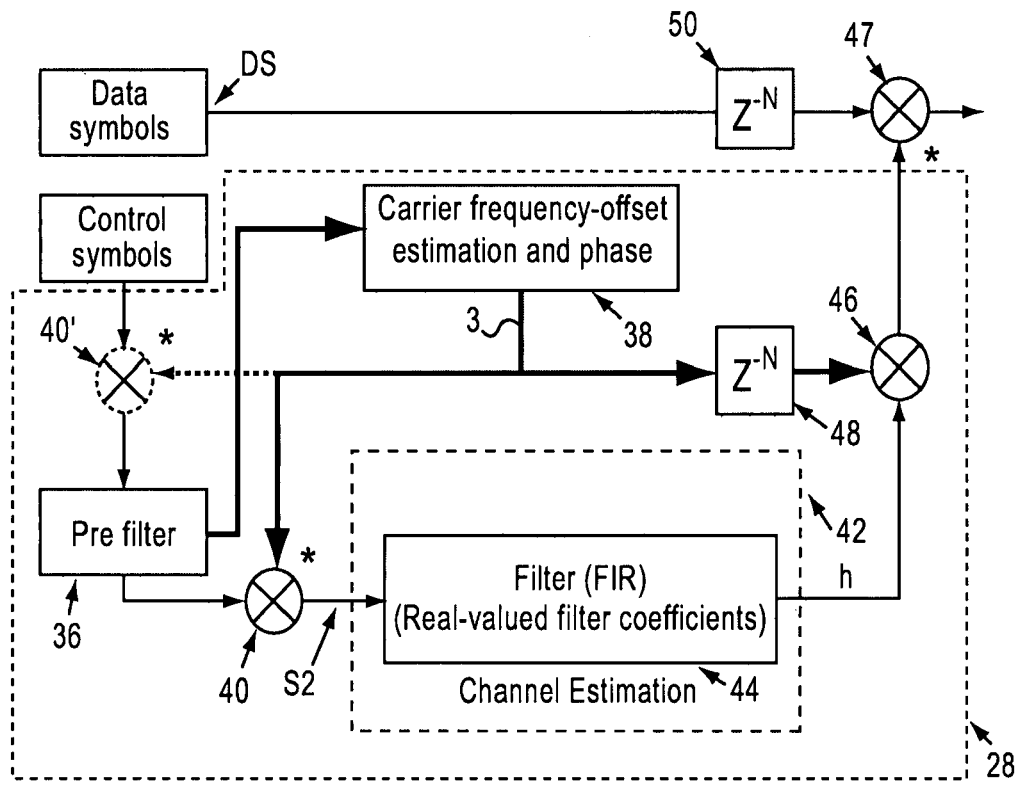
FIG. 4 is a schematic block diagram illustrating estimation of carrier frequency offset.

FIG. 4 shows the details of the channel estimation block with frequency offset correction 28. Two possible alternative implementations are shown in FIG. 4, the first being shown with bold lines, and the second being shown with dotted lines. The first implementation, which is a feed forward implementation will be discussed first. The control symbols are supplied to a prefilter 36 which averages out the control symbols to generate a suitable number of control samples per time slot. The number of samples per slot which is generated depends on the accuracy and performance requirements of the system. For the purpose of the present discussion in relation to FIG. 4, it will be assumed that there is one sample per time slot. That sample is provided to a carrier frequency offset estimation and phase rotation block 38 and also to a multiplier 40. In the present example, the frequency offset estimation block 38 implements a complex autocorrelation of the control symbol sample which is supplied to it and generates an estimate of the carrier frequency offset in the form of a complex phasor. That phasor is supplied to the multiplier 40 where it is multiplied by the control symbol sample. The output of the multiplier 40 therefore constitutes de-rotated control samples, the de-rotation being based on an estimate of the carrier frequency offset. The de-rotated control samples are supplied to a channel estimator 42 which typically is a filter 44 with real valued filter coefficients to generate a channel estimate h. The channel estimate h is supplied to a multiplier 46. The same complex phasor is supplied via a delay 48 to the multiplier 46 where it is multiplied by the channel estimate h. In this way, the channel estimates are rotated in the same manner as the control samples were de-rotated. The data symbols DS are supplied via a further delay 50 to a multiplier 47 which corresponds to the multiplier 20 in the prior art circuit of FIG. 1 in the sense that it is the multiplier which multiplies the channel estimate by the incoming data symbols to produce the data signal which is converted to a real signal and subsequently decoded. The delay 48 and the delay 50 are chosen to correspond to the delay in the channel estimation block 42. This ensures that the channel estimates which are rotated are rotated using the same phasor as that which was used to de-rotate the incoming control samples for that particular time slot.

The system which has just been described is an example of the so-called feed forward system. An alternative feed back system will now be described, still with reference to FIG. 4. In this case, reference is made to the dotted lines.

The system is initialized by setting the carrier frequency offset estimate $F_{est}$ to zero and the correction to the frequency offset estimate ($F_{est}$) also to zero. During the first round, the control symbols are rotated using an arbitrary phasor at the multiplier 40' which takes the place of the multiplier 40. The rotated values are supplied to the prefilter 36. The output from the prefilter 36 is used to estimate the correction term $F_{est}$ that is used to update the frequency offset estimate $F_{est}$ for the next round. The frequency offset estimate $F_{est}$ is used to produce phasors for the different control symbols. Assuming that the prefilter 36 changes the sampling rate to one sample per slot, the carrier frequency offset estimate $F_{est}$ gives an indication of how much the phasor should change for the next time slot. The channel estimation block 42 uses the values from the prefilter 36. Note that the sampling rate of the derotation and rotation is different here in the feedback system so that different phases could be used for different control symbols.

In this case, the phasor which is used to rotate the control symbols prior to the filter is based on the preceding control symbols which were supplied in a preceding time slot. In other respects the system is the same as that described with reference to FIG. 4.

Figure 5:
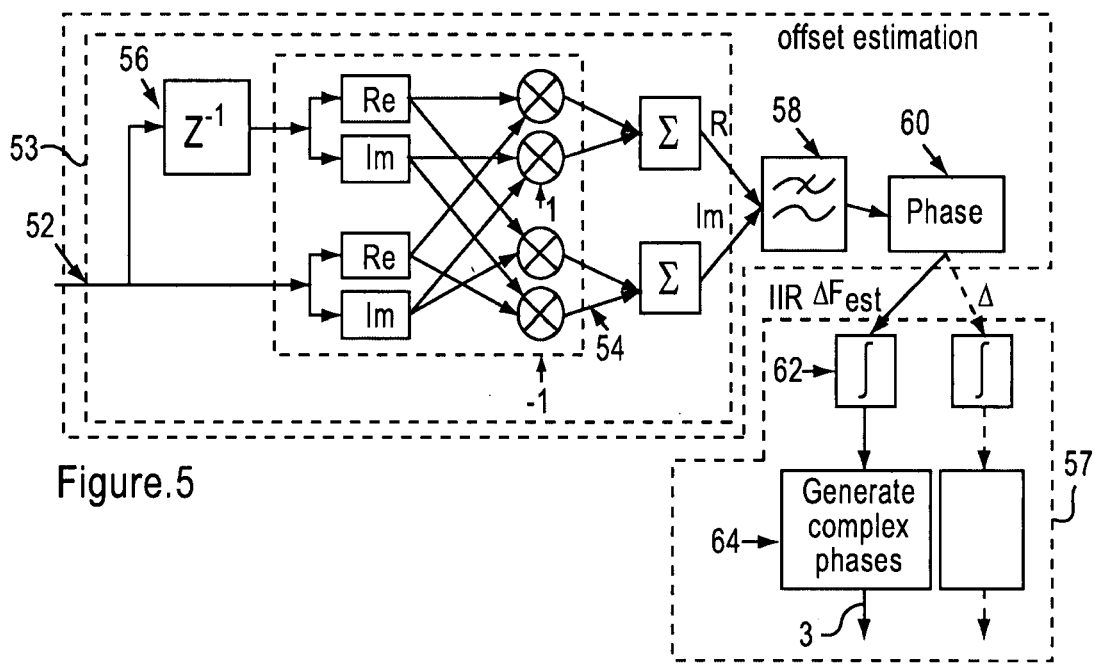
FIG. 5 is a schematic diagram illustrating one possible implementation of the carrier frequency offset estimation and phase rotation block.

FIG. 5 shows one example of how the carrier frequency offset estimation can be done and how the phasor is generated. The control samples are supplied to the offset estimation block 38 on line 52. They are supplied directly to an auto-correlation function 54 and also to that function 54 by way of a delay 56 corresponding to one time slot. The auto-correlation function generates real and imaginary parts representative of the correlated control symbols. These are labelled Re, Im. The functionality denoted by dotted line 53 implements the first lag of the complex auto-correlation. The real and imaginary parts are supplied to a filter 58, for example an IIR filter and from there to a phase generator 60. The phase generator 60 generates the angle of the complex value that gives the carrier frequency offset estimate. This angle can be computed directly in the phase generator 60, but in the described embodiment it is achieved by dividing a unit circle into a discrete number of angles, each having an index value n. In most cases, 128 points on the unit circle is enough. Each point (Pn) on the unit circle referring to an angle made up of a complex value. The correct angle is found by tracking towards the minimum of the function $\{I_m(C_{IIR}*P_n')\}$ where the value $C_{IIR}$ is the $_{IIR}$-filtered auto-correlation (Re, Im) and Pn' is the complex conjugate of Pn. Every round when the phase is estimated, the index value n is increased or decreased depending whether the function is negative or positive. Reference numeral 57 denotes the functionality for updating the phasors using the frequency offset estimate. The value n obtained each round is associated with a phase denoting the carrier frequency offset estimate. That phase indicates how much the input sample should be rotated between two consecutive prefilter outputs (slots). To generate phasors that have this phase difference, the phases are integrated in an integrator 62. That is, in the integrator 62 the phases are integrated and the phasor is generated 64. Instead of working with the actual phases, it is possible to work with the indexes n to the phases. It will be appreciated that any kind of search algorithm could be used to find the minimum of the function referred to above. The tracker discussed above is just a simple search method to find the minimum of this function, which is typically enough because the carrier frequency offset is changing slowly.

FIG. 5 also shows, in dotted lines, components that can be used to generate a second set of frequency offset estimates ΔFest2 for the same time slot. As will be clear from the foregoing, instead of correcting the carrier frequency offset slot by slot, one could do for example two corrections per slot. In that event, a phasor would be needed with a timing between the two time slots.

Figure 6:
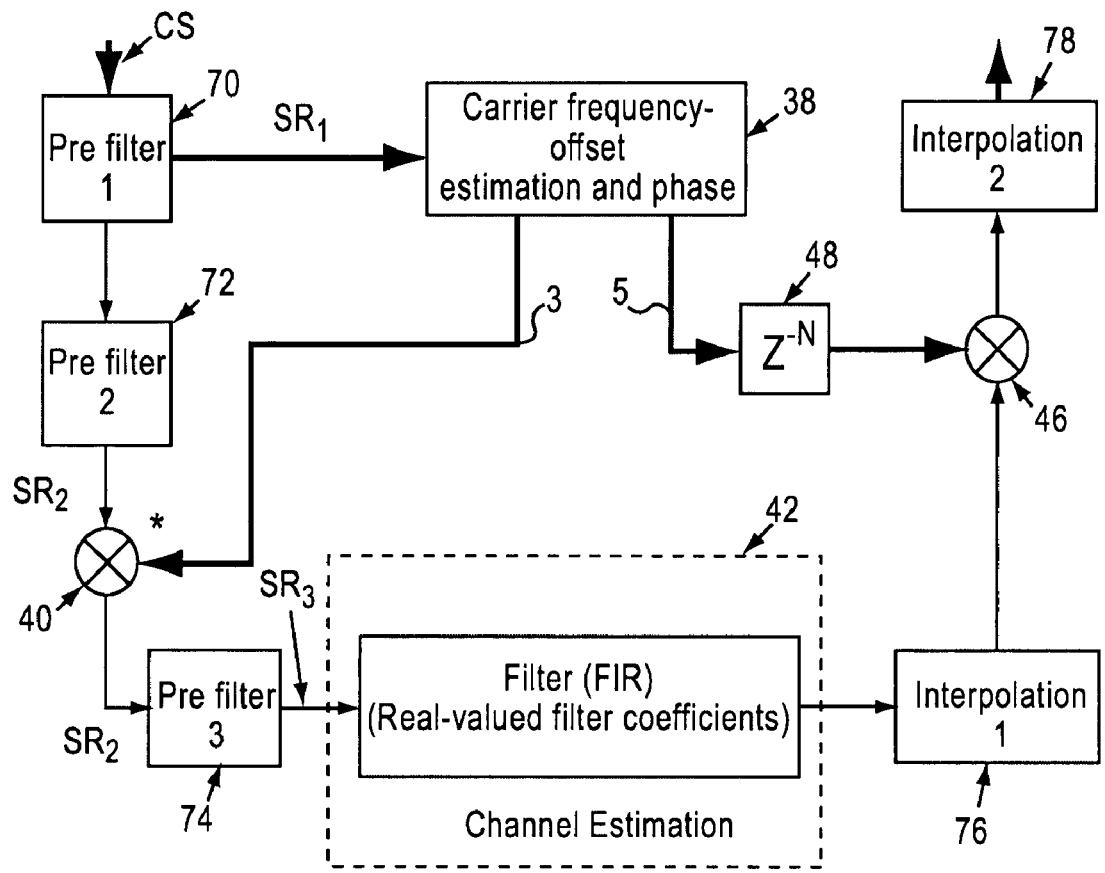
FIG. 6 is a schematic diagram of an improved feed forward system for estimating carrier frequency offset.

FIG. 6 is a schematic diagram of an improved version of the channel estimation and frequency offset estimation block 28 of a feed forward system to allow for the possibility of achieving an optimum improvement in the carrier frequency offset estimate, without unnecessarily impacting performance. To achieve this, the control symbols CS can be supplied to a first prefilter 70 which reduces the sampling rate depending on the likely magnitude of the carrier frequency errors that are likely to be needed to be corrected. Control samples at this sampling rate SR1 are supplied to the carrier frequency offset estimation block 38. Over the short period under consideration, the carrier frequency offset estimate is more or less constant. Using that estimate, phasors are generated at a sampling rate SR2 to coincide with the number of samples per slot generated by a second prefilter 72. Samples at this sampling rate are supplied to the multiplier 40 and are each corrected with a corresponding phasor 3. These samples are then supplied still at the sampling rate SR2 to a third prefilter 74 which generates samples for the channel estimator 42 at a third sampling rate SR3 which is dependent on the sampling rate of the channel estimator. As an example, the sampling rate SR1 might be 10 samples per slot, the sampling rate SR2 might be 2 samples per slot and the sampling rate SR3 might be 1 sample per slot.

On the output side of the channel estimator 2 a first interpolation block 76 is provided, the purpose of which is to provide interpolated values based on the channel estimates provided by the channel estimator 42 to increase the number of channel estimates per slot. The actual and interpolated channel estimate values are supplied to the multiplier 46. The carrier frequency offset estimation and phase rotation block 38 produces a number of phasors 5 per slot which matches the number of interpolated values per slot generated by the first interpolation block 76. These phasors are supplied via the delay 48 to the multiplier 46 where they are multiplied by the respective actual and interpolated values generated by the interpolation block 76. The thus rotated channel estimate values are supplied to a second interpolation block 78 which generates further interpolated values to the desired output sampling rate.

Figure 7:
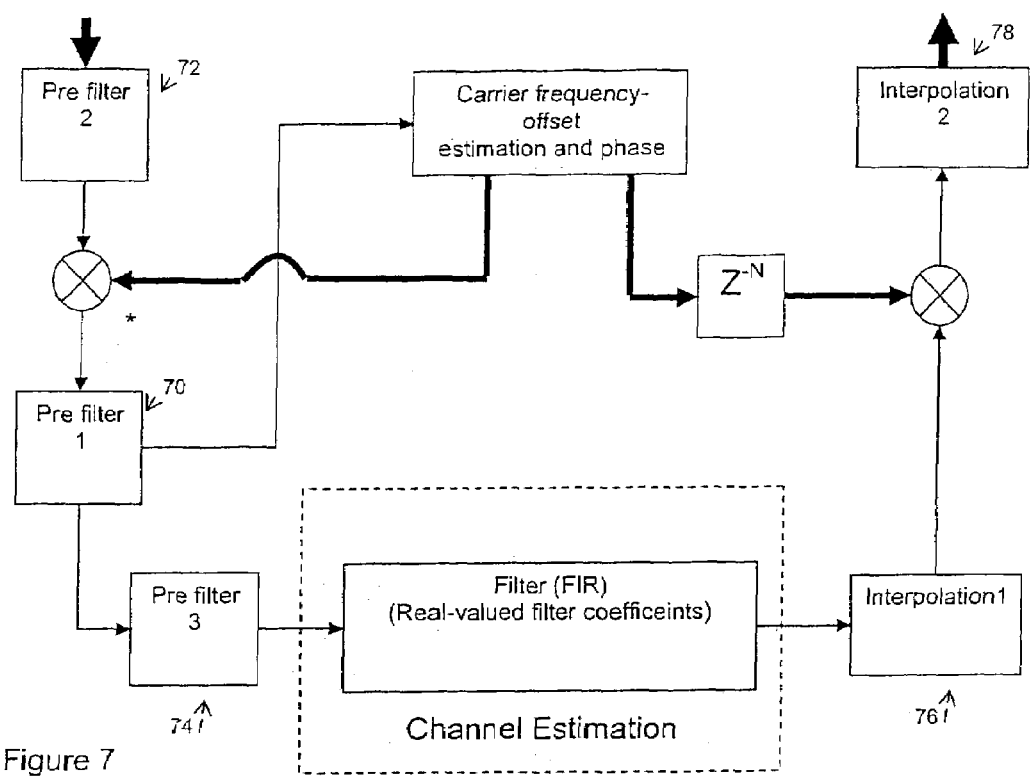
FIG. 7 is a schematic diagram of an improved feedback version for estimating carrier frequency offset.

FIG. 7 illustrates one embodiment with the addition of the first, second and third prefilters 70, 72, 74 and the first and second interpolation blocks 76, 78 in a feedback system. Apart from the change of the system to a feedback system, in other respects the filter interpolation blocks operate as described with reference to FIG. 6.

Figure 8:
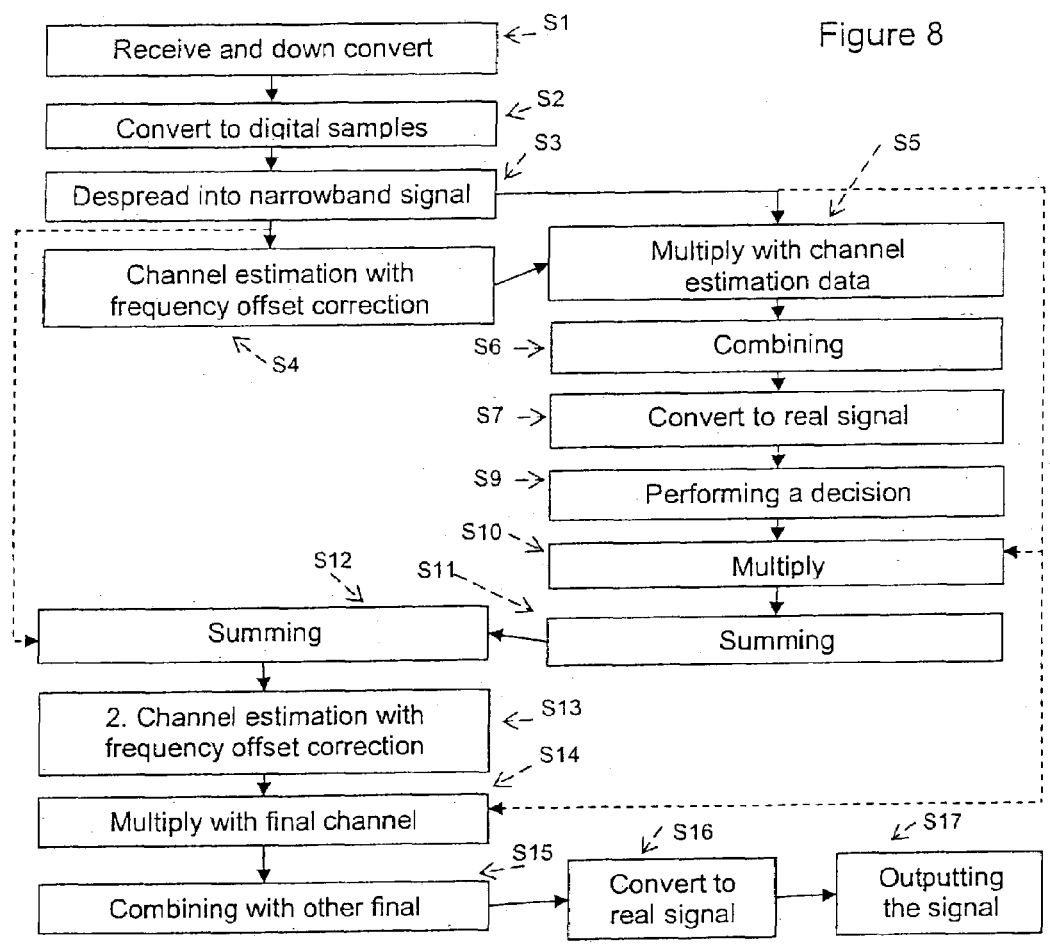
FIG. 8 is a flow diagram illustrating implementation of one embodiment of the invention with improved channel estimation.

FIG. 8 is a flow chart illustrating how the frequency offset correction technique described above can be implemented in a more advanced receiver. Thus, the steps in FIG. 8 common to FIG. 3 carry the same reference numerals. After conversion to a real signal (step S7) a decision is performed to determine the value of the symbol at step S9. The symbol values are the n multiplied at step S10 with the incoming data symbols and summed to the rate of the control symbols at step S11. These multiplied and summed data symbols are summed with the narrow band despread control symbols at step S12 to produce an improved control signal which can be used in a subsequent channel estimation step labelled S13. This channel estimation step can also include frequency offset correction as described above, although at this time it will be clear that it will be based on the data symbols and the control symbols. However, in this case the computations are not dependent on the data rate, because the data symbols have already been established for subsequent purposes. Therefore, the frequency offset correction carried out at this time can still be computed without dependence on data rate, even though data symbols are being used.

At step S14 the despread data symbols are multiplied with the final channel estimates and supplied to a combiner which combines (step S15) the results of this rake finger with other rake fingers. The combined output is converted to a real signal at step S16 and output at step S17.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A receiver for use in a mobile communications network, the receiver comprising:
   an input for receiving radio signals including control symbols and data symbols;
   a first filter at a first sampling rate connected to receive said control symbols and to generate control samples therefrom, a channel estimator arranged to use the control samples to provide a channel estimate for correcting received data symbols;

a first offset corrector for de-rotating the control samples prior to their use in providing the channel estimate;

a second filter connected to received de-rotated control samples from the first offset correct and to supply said de-rotated control samples to the channel estimator for use in providing the channel estimate at a sampling rate different from that of the de-rotated control samples received thereby;

a second offset corrector for rotating the channel estimate prior to its use in correcting the received data symbols; and an offset estimator arranged to generate estimates of frequency offset in the received radio signal, for use in the first and second offset correctors.

2. The receiver according to claim 1, wherein said control samples are used to generate said estimates of frequency offset.

3. The receiver according to claim 2, wherein the radio signals comprises a sequence of time slots, with each time slot of said sequence of time slots including data symbols and control symbols and wherein the filter is arranged to generate a first set of control samples for each time slot.

4. The receiver according to claim 3, wherein the offset estimator is arranged to produce one estimate of frequency offset for each time slot based on said first set of control samples.

5. The receiver according to claim 4, wherein the offset estimator is arranged to update a phasor for use in the first and second offset correctors, said phasor being updateable by said one estimate.

6. The receiver according to claim 5, further comprising a delay element arranged to match a delay in the channel estimator, wherein said one estimate is used to update the phasor for the second offset corrector after passing through said delay element.

7. The receiver according to claim 4, wherein said first set of control samples is de-rotated at the first offset corrector using the phasor updated by said one estimate produced for a same time slot as the control samples.

8. The receiver according to claim 4, wherein an offset estimator is arranged to generate said one estimate from control symbols of a first time slot and the first offset corrector is arranged to de-rotate said first set of control samples generated for a second time slot based on a phasor updated by said one estimate produced for the first time slot.

9. The receiver according to claim 1, wherein each of the first and second offset correctors comprises a multiplier.

10. The receiver according to claim 1, further comprising a data channel multiplier arranged to multiply a conjugate of the channel estimate with the data symbols thereby to correct the data symbols.

11. The receiver according to claim 10, wherein said data symbols are supplied to said data channel multiplier via a delay element arranged to match a delay in the channel estimator.

12. The receiver according to claim 3, further comprising a third filter arranged to receive said first set of control samples from said first filter and to produce a second set having a different number of control samples for supply to the first offset corrector.

13. The receiver according to claim 1, further comprising a first interpolator for receiving values representing said channel estimate from said channel estimator and arranged to generate interpolated values between said received values representing said channel estimate, said received values representing said channel estimate and said interpolated values being supplied to the second offset corrector.

14. The receiver according to claim 13, wherein the radio signal comprises a sequence of time slots and the offset estimator is arranged to provide in each time slot of the sequence of time slots a first set of estimates matching a number of control samples to be de-rotated, said control samples representing the control symbols and a second set of estimates matching the number of said received and interpolated values supplied to the second offset corrector.

15. The receiver according to claim 13, further comprising a second interpolator for receiving rotated channel estimate values from the second offset corrector and for providing interpolated values from said values and for supplying said received values and said interpolated values for correcting received data symbols.

16. A method of correcting frequency offset in a received radio signal, the method comprising:

generating an estimate of frequency offset in the received radio signal;

generating control samples at a first sampling rate from a control signal in the received radio signal;

de-rotating the control samples at the first sampling rate;

changing the sampling rate of the de-rotated control samples from the first sampling rate to a second sampling rate different from said first sampling rate;

providing a channel estimate using the de-rotated control symbols;

rotating the channel estimate; and using the rotated channel estimate to correct data symbols in the received radio signal;

wherein de-rotating the control symbols and rotating the channel estimate are carried out using estimates of frequency offset.

17. The method according to claim 16, further comprising generating a sequence of time slots, each time slot including data symbols and control symbols, wherein a first set of control samples is generated for each time slot of the sequence of time slots of the radio signal.

18. The method according to claim 17, further comprising producing one estimate of frequency offset for each time slot of the sequence of time slots based on said first set of control samples.

19. The method according to claim 18, wherein said one estimate is used in the rotating and de-rotating.

20. The method according to claim 18, further comprising de-rotating said first set of control samples using a phasor updated using said one estimate produced for the same time slot as the control samples.

21. The method according to claim 18, wherein producing said one estimate comprises generating said one estimate from control symbols of a first time slot and said first set of control samples generated for a second time slot is de-rotated by a phasor updated using said one estimate produced for the first time slot.

22. The method according to claim 17, further comprising producing a second set having a different number of control samples from said first set of control samples, said second set being de-rotated.

23. The method according to claim 16, further comprising receiving values representing said channel estimate from said channel estimator and generating interpolated values between received values representing said channel estimate, said received values representing said channel estimate and said interpolated values being rotated.

24. The method according to claim 23, further comprising producing interpolated values from said rotated channel estimate values and supplying interpolated values for correcting received data symbols.

25. The method according to claim 22 further comprising providing, in each time slot of a sequence of time slots, a first set of offset estimates matching a number of control samples to be de-rotated and producing a second set of offset estimates matching a number of said received and interpreted values to be rotated.

26. A receiver for use in a mobile communications network, the receiver comprising:

input means for receiving radio signals including control symbols and data symbols;

first filter means for filtering connected to receive said control symbols and generating means for generating control samples therefrom at a first sampling rate;

channel estimating means for providing a channel estimate arranged to use the control samples for correcting received data symbols;

first offset correcting means for de-rotating the control samples prior to their use in providing the channel estimate;

second filter means connected to receive de-rotated control samples from the first offset connecting means and to supply said de-rotated control samples to the channel estimating means for use in providing the channel estimate at a sampling rate different from that of the first sampling rate;

second offset correcting means for rotating the channel estimate prior to its use in correcting the received data symbols; and offset estimating means for generating estimates of frequency offset in the received radio signal, for use in the first and second offset correctors.

27. The receiver according to claim 26, wherein said control samples are used to generate said estimates of frequency offset.

28. The receiver according to claim 27, wherein the radio signals comprises a sequence of time slots, with each time slot of said sequence of time slots including data symbols and control symbols and wherein the filter means is arranged to generate a first set of control samples for each time slot.

29. The receiver according to claim 28, wherein the offset estimating means is arranged to produce one estimate of frequency offset for each time slot based on said first set of control samples.

30. The receiver according to claim 29, wherein the offset estimating means is arranged to update a phasor for use in the first and second offset correcting means, said phasor being updateable by said one estimate.

31. The receiver according to claim 30, further comprising delaying means for matching a delay in the channel estimating means, wherein said one estimate is used to update the phasor for the second offset corrector after passing through said delay element.

* * * * *